(12) United States Patent
Jeong et al.

(10) Patent No.: US 11,085,360 B2
(45) Date of Patent: Aug. 10, 2021

(54) SWIRL CHAMBER-TYPE DIESEL ENGINE

(71) Applicant: LS MTRON LTD., Anyang-si (KR)

(72) Inventors: Jae Young Jeong, Anyang-si (KR); Chang Kyu Lee, Anyang-si (KR)

(73) Assignee: LS MTRON LTD., Gyeonggi-do (KR)

( * ) Notice: Subject to any disclaimer, the term of this patent is extended or adjusted under 35 U.S.C. 154(b) by 0 days.

(21) Appl. No.: 16/637,154

(22) PCT Filed: Aug. 13, 2018

(86) PCT No.: PCT/KR2018/009236
§ 371 (c)(1),
(2) Date: Feb. 6, 2020

(87) PCT Pub. No.: WO2019/045315
PCT Pub. Date: Mar. 7, 2019

(65) Prior Publication Data
US 2020/0362749 A1 Nov. 19, 2020

(30) Foreign Application Priority Data
Aug. 30, 2017 (KR) .......................... 10-2017-0110082

(51) Int. Cl.
*F02B 19/08* (2006.01)
*F02B 19/18* (2006.01)
(Continued)

(52) U.S. Cl.
CPC .............. *F02B 19/08* (2013.01); *F02B 19/18* (2013.01); *F02F 3/24* (2013.01); *F02F 3/26* (2013.01)

(58) Field of Classification Search
CPC .......... F02B 19/08; F02B 19/18; F02B 19/10; F02F 3/24; F02F 3/26; Y02T 10/12
See application file for complete search history.

(56) References Cited

U.S. PATENT DOCUMENTS 4,635,598 A * 1/1987 Tanaka .................... F02B 19/18
123/293
4,662,330 A * 5/1987 Shioyama ............... F02B 19/08
123/269
(Continued)

FOREIGN PATENT DOCUMENTS

JP 63186912 A * 8/1988 .......... F02B 23/0672
JP 01029616 A * 1/1989 .......... F02B 23/0687
(Continued)

OTHER PUBLICATIONS

International Search Report for related International Application No. PCT/KR2018/009236; report dated Mar. 7, 2019; (3 pages).
(Continued)

*Primary Examiner* — Joseph J Dallo
(74) *Attorney, Agent, or Firm* — K&L Gates LLP

(57) ABSTRACT

A swirl chamber-type diesel engine includes a secondary combustion chamber assembly coupled to a cylinder head to define a secondary combustion chamber having, on an inner wall surface thereof, a curved swirl induction part, and a connecting passage formed at a lower end of the swirl induction part; and a piston defining a primary combustion chamber and including a trench part being in communication with the connecting passage, and clover parts formed at both sides of the trench part, in which a bottom surface of the clover part has a stereoscopic structure in which a height of a bottom surface in a second region, which is distant in a direction of a flow of the combustion gas at a predetermined distance from a first region into which the combustion gas is introduced from the trench part is greater than a height of a bottom surface in the first region.

3 Claims, 10 Drawing Sheets

(51) Int. Cl.
    *F02F 3/24*      (2006.01)
    *F02F 3/26*      (2006.01)

(56)          References Cited

U.S. PATENT DOCUMENTS 4,881,501  A  *  11/1989  Shinzawa ........... F02B 23/0639
                                                          123/279
    5,024,194  A  *   6/1991  Shinzawa ................. F02F 3/26
                                                          123/269
    5,058,537  A  *  10/1991  Paul .......................... F16J 1/22
                                                          123/51 BA
    5,076,229  A  *  12/1991  Stanley .................. F02B 19/04
                                                          123/289
    5,305,720  A  *   4/1994  Ando ....................... F02F 3/26
                                                          123/193.4
    5,335,634  A  *   8/1994  Hashimoto ............. F02B 23/08
                                                          123/188.14
    5,836,284  A  *  11/1998  Oda ...................... F02B 17/005
                                                          123/308
    6,092,501  A  *   7/2000  Matayoshi ........... F02F 1/4214
                                                          123/301
    9,151,502  B2 * 10/2015  Crothers ................. F23D 14/02

FOREIGN PATENT DOCUMENTS

JP           H04330324 A         11/1992
    JP             06330750 A    *   11/1994
    JP            H0828271 A          1/1996
    JP           2002174123 A         6/2002
    JP           2002285846 A        10/2002
    JP           2005207312 A         8/2005
    KR      10-1999-0004022           1/1999
    KR          19990060748 A         7/1999
    KR          20020053242 A    *    7/2002
    KR          20020053242 A         7/2002
    KR            100729293 B1        6/2007

OTHER PUBLICATIONS

Written Opinion for related International Application No. PCT/KR2018/009236; report dated Mar. 7, 2019; (5 pages).
Korean Office Action for related Korean Application No. 10-2017-0110082; action dated Sep. 21, 2020; (5 pages).

* cited by examiner

SECTION A-A

SECTION B-B

SECTION A-A

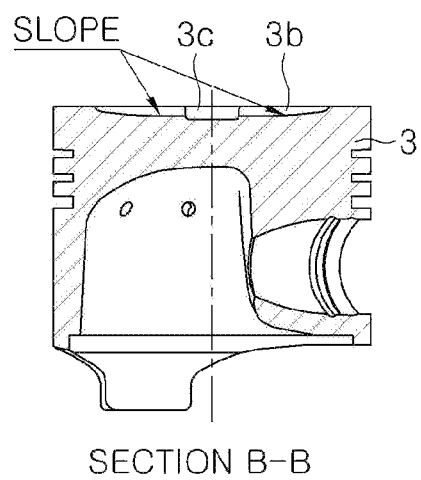

⇨ : FLOW OF COMBUSTION GAS

⇨ : FLOW OF COMBUSTION GAS

SWIRL CHAMBER-TYPE DIESEL ENGINE

CROSS REFERENCE TO RELATED APPLICATIONS

The present application is a National Stage of International Application No. PCT/KR2018/009236 filed on Aug. 13, 2018, which claims the benefit of Korean Patent Application No. 10-2017-0110082 filed on Aug. 30, 2017 with the Korean Intellectual Property Office, the entire contents of each hereby incorporated by reference.

FIELD OF TECHNOLOGY

The present invention relates to a swirl chamber-type diesel engine and, more particularly, to a swirl chamber-type diesel engine in which a bottom surface of each of the clover parts positioned at the periphery of a trench part in a primary combustion chamber of the swirl chamber-type diesel engine has a helical stereoscopic structure, such that a strong swirl of combustion gas introduced into the clover part is formed, thereby obtaining a higher oxidation capability.

BACKGROUND

There is no great intrinsic difference between diesel engines and gasoline engines in terms of main structures (cylinder heads, cylinder blocks, piston connecting assemblies, crank shafts, cam shafts, and valve mechanisms) that convert thermal energy into mechanical energy.

However, there is a difference between the gasoline engine and the diesel engine in terms of processes of combusting fuel. While the gasoline engine compresses a gas mixture of air and fuel and then ignites the fuel by producing an electrical flame, the diesel engine ignites fuel by means of autoignition (compression ignition) by drawing only air, compressing the air at a high compression ratio so that a temperature of air is raised to 500 to 600° C. or higher, pressing the fuel with an injection pump, and then injecting the fuel into a cylinder from an injection nozzle.

A combustion chamber of the diesel engine needs to meet the following requirements. The injected fuel needs to be completely combusted within a short period of time as quickly as possible, an average effective pressure needs to be high, and a fuel consumption rate needs to be low. In addition, a combustion state needs to be good even at a high rotational speed, the diesel engine needs to operate easily, and diesel knock needs to be less generated.

The injection nozzle is installed in the cylinder head and provided above the combustion chamber. The injection nozzle is a device configured to inject, into the combustion chamber, the finely atomized high-pressure fuel supplied from the injection pump. The fuel spray injected from the injection nozzle needs to be excellent in atomization and penetration properties and needs to be evenly injected and to have appropriate injection degree and rate. A flow coefficient of the nozzle also needs to be accurate.

Based on the types of combustion chambers, the diesel engines are classified into a direct-injection chamber type diesel engine which is a single-chamber type diesel engine, a pre-combustion chamber type diesel engine which is a double-chamber type diesel engine, and a swirl chamber-type diesel engine. The direct-injection chamber type diesel engine has a structure in which a combustion chamber is defined by a cylinder head and a concave-convex portion provided on a piston head and fuel is injected directly into the combustion chamber. The direct-injection chamber type diesel engine is called a single-chamber type diesel engine because the direct-injection chamber type diesel engine has only a primary combustion chamber. The combustion chamber has a heart shape, a spherical shape, a hemispheric shape, or the like.

The pre-combustion chamber type diesel engine has a structure in which a pre-combustion chamber is provided above a primary combustion chamber formed between a piston and a cylinder head, a part of injected fuel is combusted in the pre-combustion chamber to produce high-temperature, high-pressure gas, and the remaining part of the fuel is injected into the primary combustion chamber and then completely combusted by the high-temperature, high-pressure gas.

The swirl chamber-type diesel engine has a swirl chamber provided in a cylinder or a cylinder head, such that a swirl is generated in the swirl chamber by a compression stroke. When fuel is injected into the swirl chamber, the injected fuel is ignited and combusted by being mixed with swirling air and then discharged into a primary combustion chamber. Further, in the primary combustion chamber, non-combusted fuel is combusted by being mixed with new air.

FIG. 1 is a view illustrating an internal structure of a combustion chamber of a swirl chamber-type diesel engine in the related art. FIG. 1 mainly illustrates a structure of a secondary combustion chamber (swirl chamber) 2a.

Referring to FIG. 1, the secondary combustion chamber 2a is provided as a secondary combustion chamber assembly 2 is separately assembled in a cylinder head 1. A primary combustion chamber 3a is formed in an upper surface of a piston 3. In the cylinder head 1, an injection nozzle 4 is provided at a center upper end of the secondary combustion chamber 2a so as to inject fuel into the secondary combustion chamber 2a. A glowplug 5 is mounted at an upper end of the secondary combustion chamber 2a. The glowplug 5 is installed because a temperature in the combustion chamber is low when the engine starts or operates at a low speed. A connecting passage 2b is inclinedly provided at a lower end of the secondary combustion chamber 2a, and the air is introduced from the primary combustion chamber 3a through the connecting passage 2b. The connecting passage 2b is mainly provided in a direction tangential to the secondary combustion chamber 2a. Further, a coolant passage 1a is formed at the periphery of the secondary combustion chamber 2a.

In the compression stroke in the swirl chamber-type combustion chamber configured as described above, a strong swirl is generated, as indicated by the arrows ((A) in FIG. 1), when compressed air introduced from the primary combustion chamber 3a flows into the secondary combustion chamber 2a through the connecting passage 2b. At this time, the fuel is injected from the injection nozzle 4, and the fuel is mostly combusted in the secondary combustion chamber 2a.

The swirl chamber-type combustion chamber in the related art is a Commet Vb type invented by Ricardo, and the secondary combustion chamber 2a may be connected to the primary combustion chamber 3a through the connecting passage 2b, as illustrated in FIG. 2A. In this case, as illustrated in FIG. 2B, the primary combustion chamber 3a is formed with a trench part 3c into which the combustion gas is directly guided from the secondary combustion chamber 2a through the connecting passage 2b, and clover parts 3b configured to diffuse the combustion gas at the periphery of the trench part 3c. In this case, the clover part 3b has a cylindrical shape in which a bottom surface thereof has a flat surface structure. The clover parts 3b may be disposed at the periphery of the trench part 3c, particularly, at the periphery of the trench part 3c including left and right sides of the trench part 3c, based on a direction of a flow of the combustion gas.

However, because of the clover parts 3b structured as described above, when the gas mixture combusted in the secondary combustion chamber 2a is discharged to the primary combustion chamber 3a, swirls cannot be appropriately formed in the clover parts 3b, and complicated flows cannot be activated, which may cause a deterioration in oxidation capability and thus an increase in emission of harmful substances, particularly, particulate matters (PM) in exhaust gas.

The present invention has been made in an effort to solve the aforementioned problems, and an object of the present invention is to provide a swirl chamber-type diesel engine, in which combustion gas discharged from a secondary combustion chamber 2a to a primary combustion chamber 3a may form a strong swirl in clover parts 3b, thereby improving the oxidation capability and effectively inhibiting the production of harmful substances such as particulate matters (PM) included in exhaust gas.

The detailed objects of the present invention will be apparently identified and understood by experts or researchers in this technical field through the specific description disclosed below.

SUMMARY

In order to achieve the aforementioned object, a swirl chamber-type diesel engine according to an exemplary embodiment of the present invention includes: a secondary combustion chamber assembly 2 coupled to a cylinder head 1 to define a secondary combustion chamber 2a having, on an inner wall surface thereof, a curved swirl induction part 2d, and a connecting passage 2b formed at a lower end of the swirl induction part 2d; and a piston 3 defining a primary combustion chamber 3a and including a trench part 3c being in communication with the connecting passage 2b, and clover parts 3b formed at both sides of the trench part 3c, in which a bottom surface of the clover part 3b has a stereoscopic structure in which a height of a bottom surface in a second region, which is distant in a direction of a flow of the combustion gas at a predetermined distance from a first region into which the combustion gas is introduced from the trench part 3c is greater than a height of a bottom surface in the first region.

In this case, the bottom surface of the clover part 3b may have a stereoscopic structure in which the height of the bottom surface is gradually increased in the direction of the flow of the combustion gas so that the introduced combustion gas flows while being gradually raised.

In addition, the clover parts 3b may have cylindrical structures disposed adjacent to both sides of the trench part 3c, and each may include a spiral structure in which the height of the bottom surface is gradually increased in the direction of the flow of the combustion gas.

Further, the clover part 3b may have a structure in which the height of the bottom surface is gradually increased toward an outer periphery thereof.

In addition, the bottom surface of the trench part 3c may have a predetermined gradient so that the combustion gas to be introduced into the clover part 3b is introduced while being raised.

In the swirl chamber-type diesel engine according to the exemplary embodiment of the present invention, each of the bottom surfaces of the clover parts positioned at the periphery of the trench part in the primary combustion chamber of the swirl chamber-type diesel engine is implemented to have a helical stereoscopic structure, as a result of which it is possible to improve the oxidation capability of the diesel engine and to effectively inhibit the production of harmful substances such as particulate matters (PM) included in exhaust gas.

BRIEF DESCRIPTION OF THE DRAWINGS

The accompanying drawings included as a part of the detailed description for helping to understand the present invention provide exemplary embodiments of the present invention, and the technical spirit of the present invention will be described with reference to the detailed description.

FIGS. 4A, 4B, and 4C are views illustrating a structure of a primary combustion chamber of the swirl chamber-type diesel engine according to an exemplary embodiment of the present invention.

DETAILED DESCRIPTION

Figure 1:
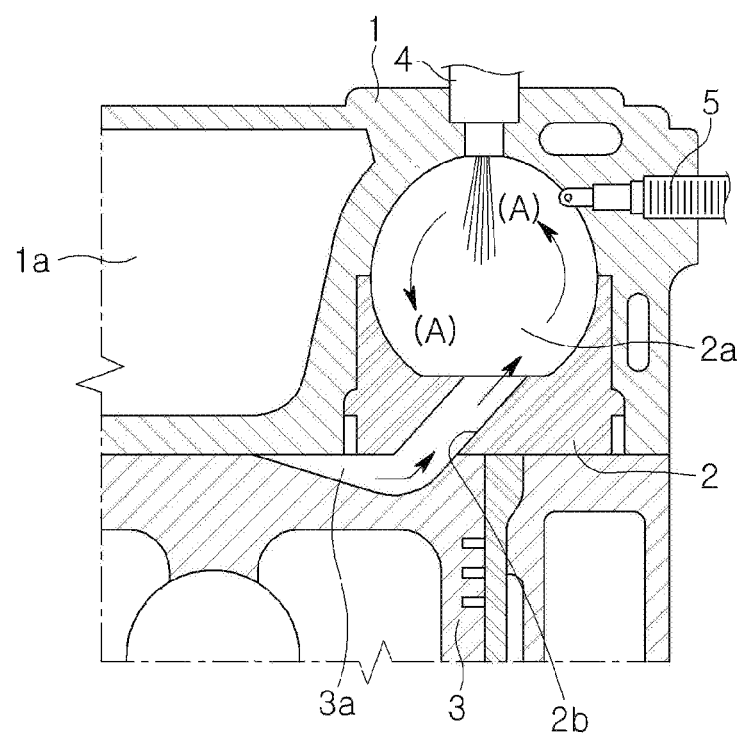
FIG. 1 is an exemplified view illustrating a structure of a combustion chamber of a swirl chamber-type diesel engine in the related art.

Hereinafter, exemplary embodiments of the present invention will be described in detail with reference to the accompanying drawings. First, in assigning reference numerals to constituent elements of the respective drawings, it should be noted that the same constituent elements will be designated by the same reference numerals, if possible, even though the constituent elements are illustrated in different drawings. In addition, in the description of the present invention, the specific descriptions of publicly known related configurations or functions will be omitted when it is determined that the specific descriptions may obscure the subject matter of the present invention. Further, the exemplary embodiments of the present invention will be described below, but the technical spirit of the present invention is not limited thereto and may of course be carried out by those skilled in the art.

First, a configuration and an operation of a general swirl chamber-type diesel engine will be schematically described with reference to FIGS. 2A and 2B, and then technical features of the present invention will be described.

More specifically, there is enough time to form a gas mixture in medium and large diesel engines, and thus the contact between fuel and air may be sufficiently achieved only by injecting the fuel. However, in a small or high-speed diesel engine, it is difficult to complete combustion in a short period of time without the aid of a swirl of air. In order to solve this problem, various types of combustion chamber structures, such as a swirl chamber-type combustion chamber structure, are used. In particular, a swirl chamber-type diesel engine is structured to combust fuel by injecting the fuel into a swirl formed in a secondary combustion chamber 2a in a compression stroke.

Figure 2A:
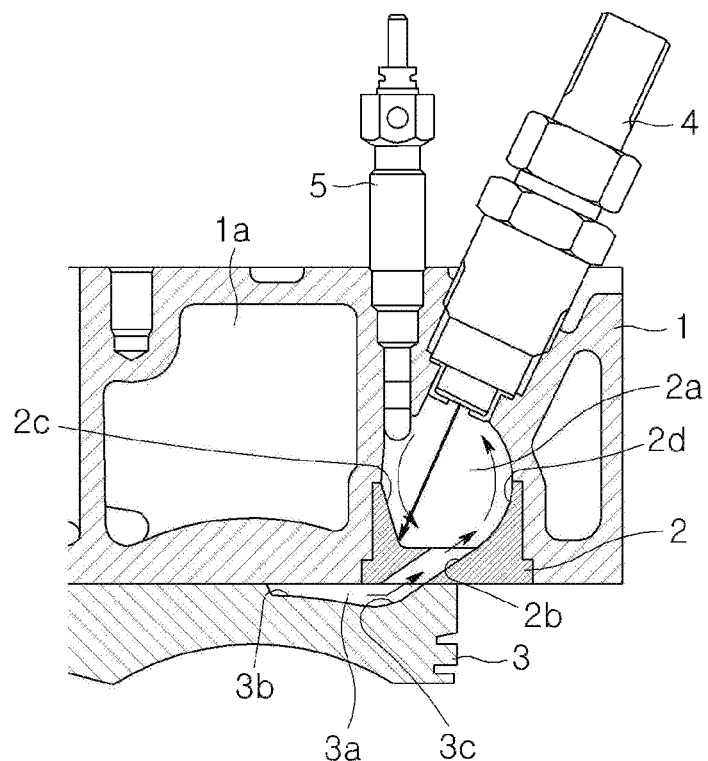
FIGS. 2A and 2B are views for explaining a structure of a combustion chamber of a general swirl chamber-type diesel engine.
Figure 2B:
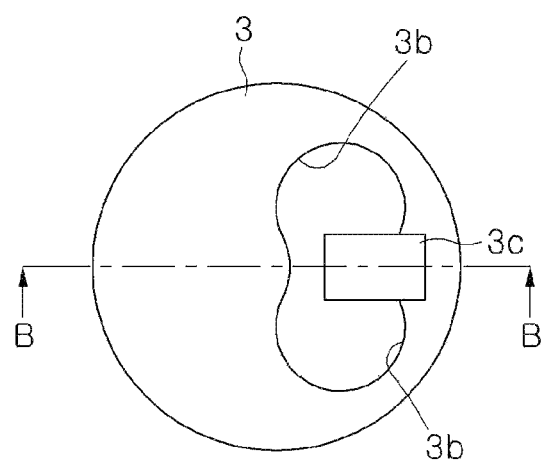

As illustrated in FIG. 2A, the swirl chamber-type diesel engine may generally include a primary combustion chamber 3a and the secondary combustion chamber 2a.

In this case, the secondary combustion chamber 2a may be formed as a secondary combustion chamber assembly 2 is provided in a cylinder head 1. An injection nozzle 4 is provided at an upper end of a center of the secondary combustion chamber 2a, and the injection nozzle 4 may eccentrically inject the fuel toward a fuel collision part 2c formed on one side wall surface of the secondary combustion chamber 2a and having a straight cross-sectional shape. In addition, a swirl induction part 2d having a curved shape is provided on the other side wall surface of the secondary combustion chamber 2a and forms a swirl when compressed air introduced from the primary combustion chamber 3a flows to the secondary combustion chamber 2a via a connecting passage 2b.

In addition, the connecting passage 2b may be inclinedly formed at a lower end of the secondary combustion chamber 2a, and the connecting passage 2b connects the secondary combustion chamber 2a and the primary combustion chamber 3a and provides a passageway through which air is introduced from the primary combustion chamber 3a to the secondary combustion chamber 2a. The connecting passage 2b may be provided mainly in a direction tangential to the swirl induction part 2d of the secondary combustion chamber 2a.

Further, a glowplug 5 is provided in the secondary combustion chamber 2a to prevent a temperature in the combustion chamber from being lowered when the engine starts or operates at a low speed. Further, a coolant passage 1a may be formed at the periphery of the secondary combustion chamber 2a.

In addition, the primary combustion chamber 3a may be formed in an upper surface of a piston 3. In this case, as illustrated in FIG. 2B, the primary combustion chamber 3a is formed with a trench part 3c into which the combustion gas is directly guided from the secondary combustion chamber 2a through the connecting passage 2b and clover parts 3b configured to diffuse the combustion gas at the periphery of the trench part 3c.

In this case, when the combustion gas produced in the secondary combustion chamber 2a is discharged to the primary combustion chamber 3a, the swirls cannot be appropriately formed in the clover parts 3b and complicated flows cannot be activated, which may cause a deterioration in oxidation capability and thus a problem of an increase in emission of harmful substances, particularly, particulate matters (PM) in exhaust gas.

Figure 3A:
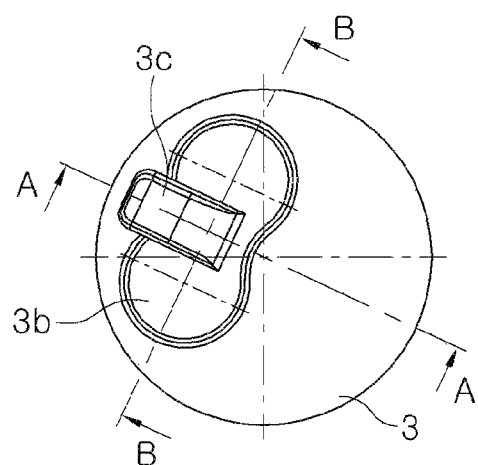
FIGS. 3A, 3B, and 3C are views illustrating a structure of a primary combustion chamber of a general swirl chamber-type diesel engine.
Figure 3B:
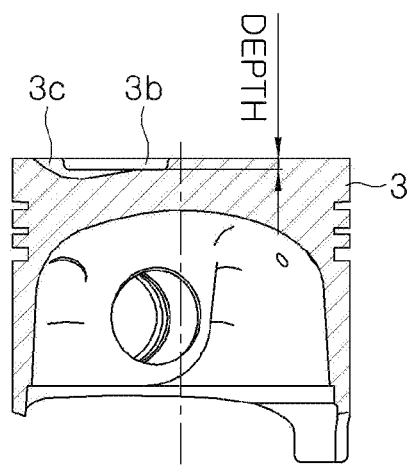
Figure 3C:
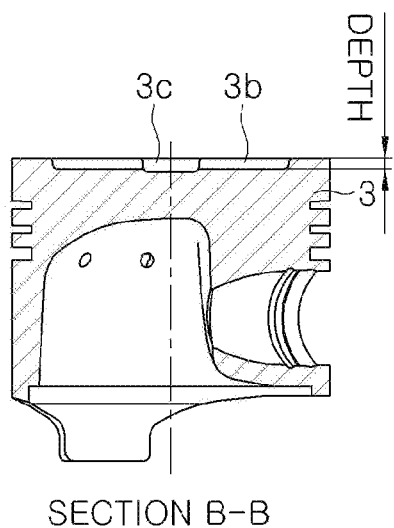

More specifically, referring to FIG. 3A, in the typical swirl chamber-type diesel engine in the related art, the clover parts 3b of the primary combustion chamber 3a may be disposed adjacent to left and right sides of the trench part 3c. In particular, as illustrated in FIGS. 3B and 3C, a bottom surface of the clover part 3b has a flat surface structure having a constant depth. For this reason, a swirl of the combustion gas cannot be effectively formed in the clover part 3b and complete combustion cannot be achieved and, as a result, exhaust gas including harmful substances such as particulate matters (PM) is produced.

Figure 4A:
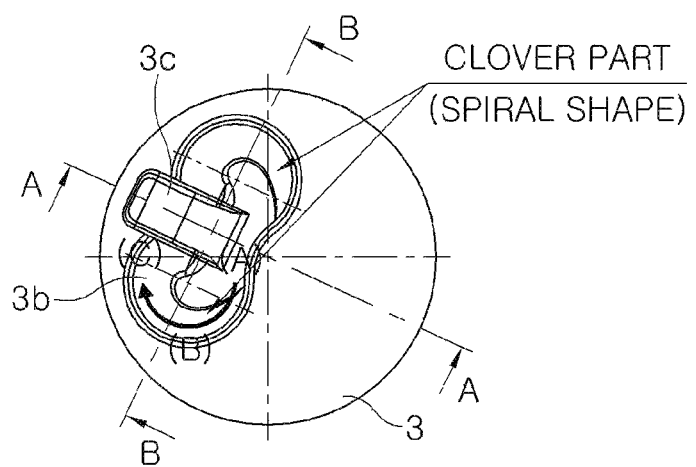
Figure 4B:
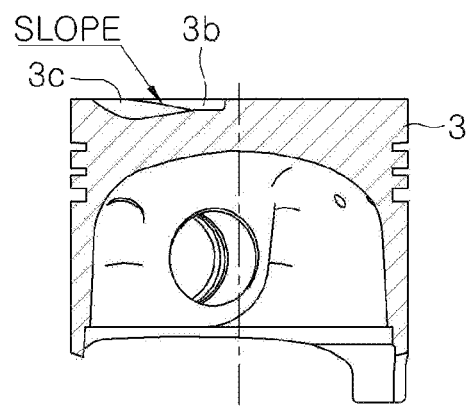

In contrast, as illustrated in FIGS. 4A, 4B, and 4C, in the primary combustion chamber 3a of the swirl chamber-type diesel engine according to the exemplary embodiment of the present invention, a bottom surface of the clover part 3b has a stereoscopic structure in which a height of a bottom surface of a second region ((C) in FIG. 4A), which is distant in a direction (indicated by the arrow (B) in FIG. 4A) of the flow of the combustion gas at a predetermined distance from a first region ((A) in FIG. 4A) into which the combustion gas is introduced from the trench part 3c is greater than a height of a bottom surface of the first region. As a result, a strong swirl may be formed in the clover part 3b, complicated flows may be activated, and the oxidation capability may be improved, as a result of which it is possible to effectively inhibit emission of harmful substances, particularly, particulate matters (PM) in exhaust gas.

That is, the swirl chamber-type diesel engine according to the exemplary embodiment of the present invention is the swirl chamber-type diesel engine including: the secondary combustion chamber assembly 2 coupled to the cylinder head 1 to define the secondary combustion chamber 2a having, on the inner wall surface thereof, the curved swirl induction part 2d and the connecting passage 2b formed at the lower end of the swirl induction part 2d; and the piston 3 defining the primary combustion chamber 3a and including the trench part 3c being in communication with the connecting passage 2b and the clover parts 3b formed at the left and right sides of the trench part 3c, in which the bottom surface of the clover part 3b has the stereoscopic structure in which the height of the bottom surface of the second region ((C) in FIG. 4A), which is distant in the direction (indicated by arrow (B) in FIG. 4A) of the flow of the combustion gas at the predetermined distance from the first region ((A) in FIG. 4A) into which the combustion gas is introduced from the trench part 3c is greater than the height of the bottom surface of the first region.

Further, referring to FIGS. 4B and 4C, in the primary combustion chamber 3a of the swirl chamber-type diesel engine according to the exemplary embodiment of the present invention, the bottom surface of the clover part 3b does not have the flat surface structure, but has the stereoscopic structure in which the height of the bottom surface is gradually increased in the direction of the flow of the combustion gas.

Therefore, the combustion gas introduced into the clover part 3b flows while being raised along the shape of the bottom surface of the clover part 3b, thereby forming a stronger swirl.

More specifically, the features of the primary combustion chamber 3a of the swirl chamber-type diesel engine according to the exemplary embodiment of the present invention in comparison with the general swirl chamber-type diesel engine will be described in detail with reference to FIGS. 5A, 5B, 5C, 6A, 6B, and 6C.

Figure 5A:
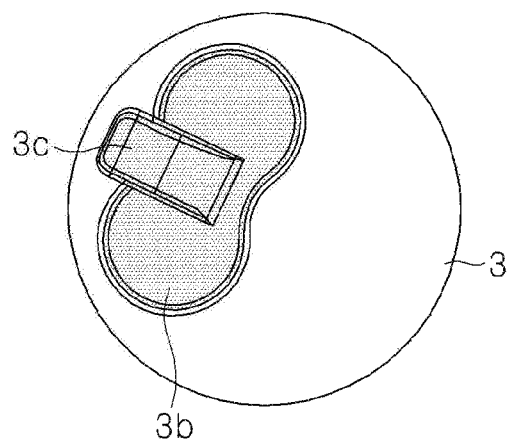
FIGS. 5A, 5B, and 5C are views for explaining features of a primary combustion chamber of a general swirl chamber-type diesel engine.
Figure 5B:
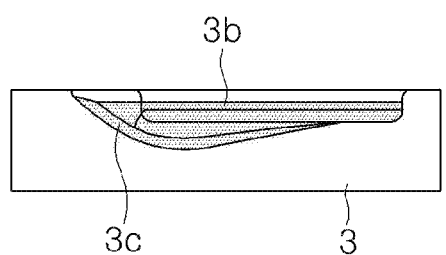
Figure 5C:
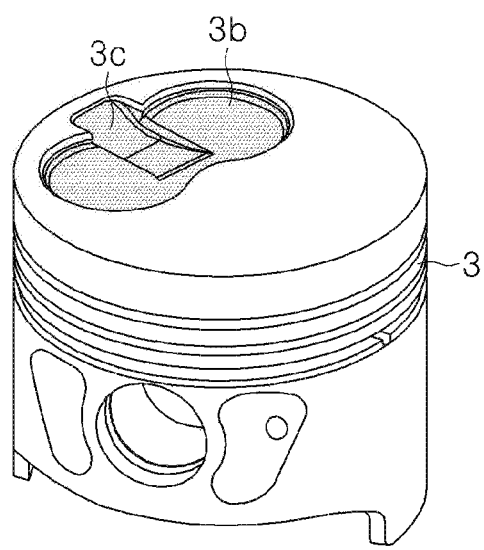

First, FIG. 5A is a top plan view, FIG. 5B is a cross-sectional side view, and FIG. 5C is a perspective view illustrating the shape of the primary combustion chamber 3a formed in the upper surface of the piston 3 of the general swirl chamber-type diesel engine.

In particular, as illustrated in FIGS. 5B and 5C, the clover part 3b of the primary combustion chamber 3a of the general swirl chamber-type diesel engine has the flat surface structure in which the bottom surface of the clover part 3b has the constant depth. As a result, when the gas mixture combusted in the secondary combustion chamber 2a is discharged to the primary combustion chamber 3a, a swirl of the combustion gas cannot be effectively formed in the clover part 3b, and complete combustion cannot be achieved, which causes a problem of production of exhaust gas including harmful substances such as particulate matters (PM).

Figure 6A:
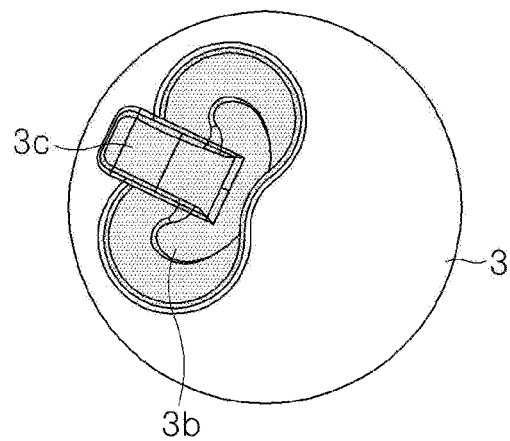
FIGS. 6A, 6B, and 6C are views for explaining features of the primary combustion chamber of the swirl chamber-type diesel engine according to the exemplary embodiment of the present invention.
Figure 6B:
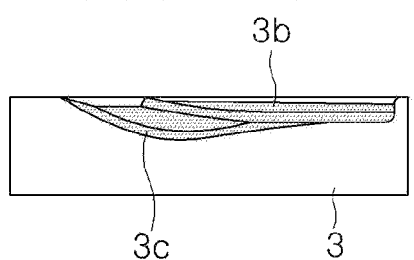
Figure 6C:
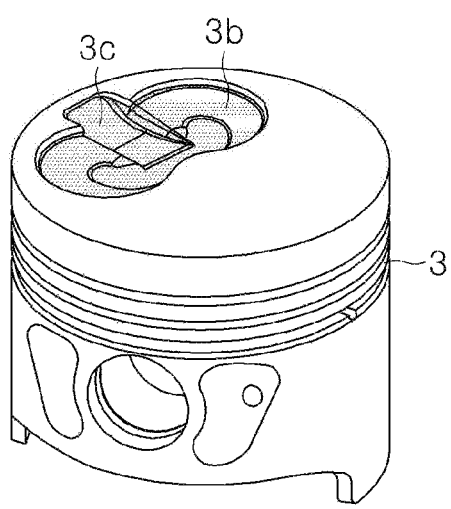

In contrast, FIGS. 6A, 6B, and 6C specifically illustrate features of the swirl chamber-type diesel engine according to the exemplary embodiment of the present invention.

More specifically, FIG. 6A is a top plan view, FIG. 6B is a cross-sectional side view, and FIG. 6C is a perspective view illustrating the shape of the primary combustion chamber 3a formed in the upper surface of the piston 3 of the swirl chamber-type diesel engine according to the exemplary embodiment of the present invention.

In particular, as illustrated in FIGS. 6B and 6C, the bottom surface of the clover part 3b of the primary combustion chamber 3a of the swirl chamber-type diesel engine according to the exemplary embodiment of the present invention has the stereoscopic structure in which the height of the bottom surface of the second region, which is distant in the direction of the flow of the combustion gas at the predetermined distance from the first region into which the combustion gas is introduced from the trench part 3c is greater than the height of the bottom surface of the first region. As a result, a strong swirl of the combustion gas introduced into the clover part 3b may be formed, complicated flows may be activated, and the oxidation capability may be improved, as a result of which it is possible to effectively inhibit emission of harmful substances, particularly, particulate matters (PM) in exhaust gas.

Furthermore, the bottom surface of the clover part 3b may have the stereoscopic structure in which the height of the bottom surface is gradually increased in the direction of the flow of the combustion gas so that the introduced combustion gas may flow while being gradually raised. In particular, the clover parts 3b have cylindrical structures disposed adjacent to the left and right sides of the trench part 3c, and each of the clover parts 3b has the stereoscopic structure including a spiral structure in which the height of the bottom surface is gradually increased in the direction of the flow of the combustion gas. As a result, the combustion gas introduced into the clover part 3b flows while being raised along the shape of the bottom surface of the clover part 3b, thereby forming a strong swirl.

In addition, as illustrated in FIG. 6C, the clover part 3b may include a structure in which the height of the bottom surface is gradually increased toward an outer periphery thereof. Further, the bottom surface of the trench part 3c may have a predetermined gradient, such that the combustion gas may be introduced into the clover part 3b while being raised along the gradient of the bottom surface of the trench part 3c.

Figure 7A:
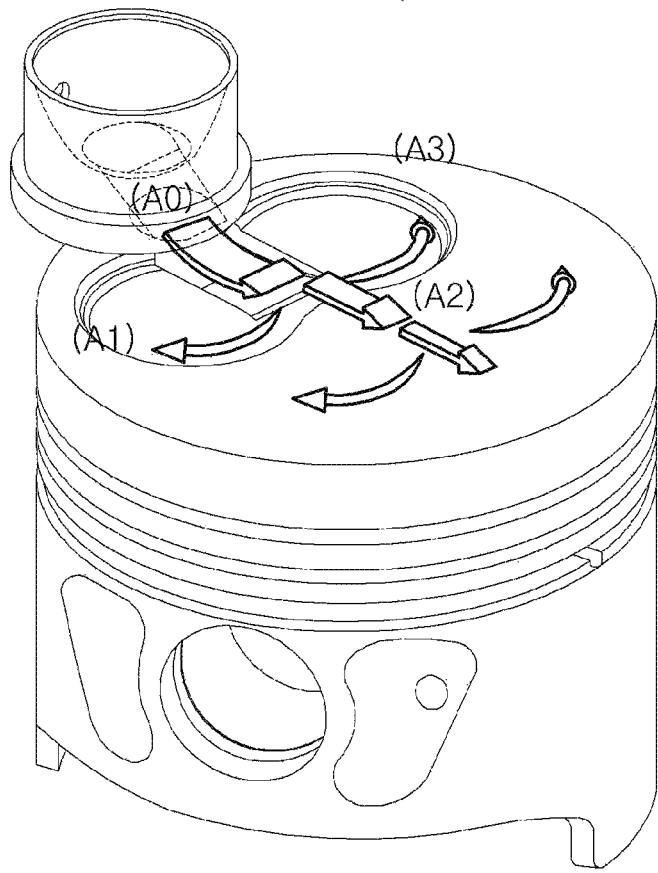
FIGS. 7A and 7B are views for explaining the improvement of a flow of combustion gas in the structure of the primary combustion chamber of the swirl chamber-type diesel engine according to the exemplary embodiment of the present invention.
Figure 7B:
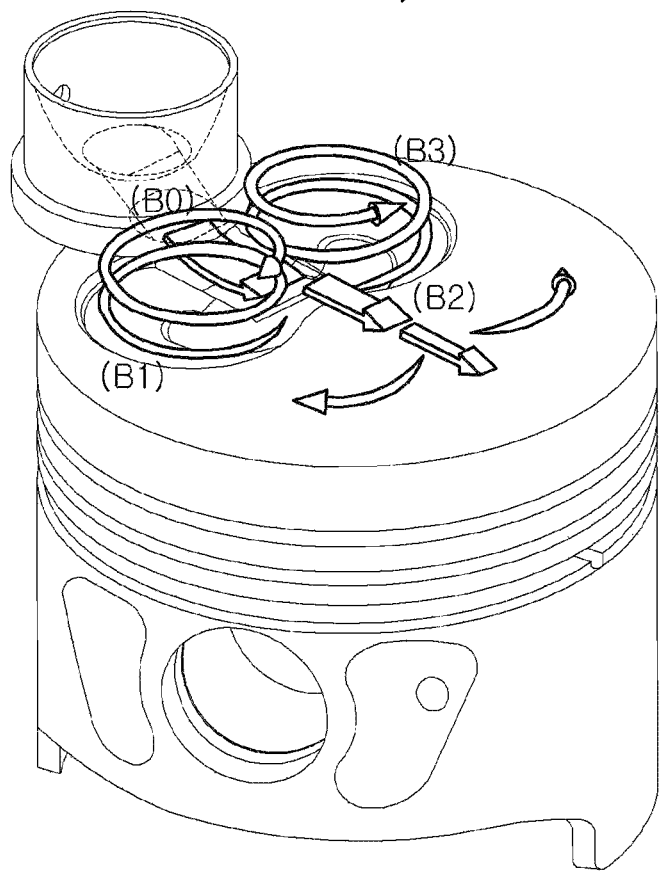

FIGS. 7A and 7B illustrate the improvement of the flow of the combustion gas in accordance with the stereoscopic structure of the bottom surface of the clover part 3b in the swirl chamber-type diesel engine according to the exemplary embodiment of the present invention. First, as illustrated in FIG. 7A, when the combustion gas produced in the secondary combustion chamber 2a is discharged to the primary combustion chamber 3a in the typical swirl chamber-type diesel engine in the related art ((A0) in FIG. 7A), a swirl cannot be appropriately formed because the combustion gas introduced into the clover part 3b flows along the flat bottom surface having a constant depth ((A1) and (A3) in FIG. 7A). As a result, there may occur problems in that complicated flows cannot be activated, the oxidation capability may deteriorate, and emission of harmful substances, particularly, particulate matters (PM) in exhaust gas may be increased.

In contrast, as illustrated in FIG. 7B, in the swirl chamber-type diesel engine according to the exemplary embodiment of the present invention, the bottom surface of the clover part 3b of the primary combustion chamber 3a has the stereoscopic structure in which the height of the bottom surface is gradually increased in the direction of the flow of the combustion gas so that the introduced combustion gas may flow while being raised gradually. As a result, the combustion gas introduced into the clover part 3b flows while being raised along the shape of the bottom surface of the clover part 3b, thereby forming a stronger swirl.

More specifically, since the bottom surface of the clover part 3b of the primary combustion chamber 3a has the stereoscopic structure in which the height of the bottom surface is gradually increased in the direction of the flow of the combustion gas, a swirl is strongly formed in the clover part 3b when the combustion gas produced in the secondary combustion chamber 2a is discharged to the primary combustion chamber 3a in the swirl chamber-type diesel engine according to the exemplary embodiment of the present invention ((BO) in FIG. 7B). As a result, complicated flows may be activated, the oxidation capability may be improved, and emission of harmful substances, particularly, particulate matters (PM) in exhaust gas may be effectively inhibited.

The above description is simply given for illustratively describing the technical spirit of the present invention, and those skilled in the art to which the present invention pertains will appreciate that various modifications, changes, and substitutions are possible without departing from the essential characteristic of the present invention. Accordingly, the exemplary embodiments disclosed in the present invention and the accompanying drawings are intended not to limit but to describe the technical spirit of the present invention, and the scope of the technical spirit of the present invention is not limited by the exemplary embodiments and the accompanying drawings. The protective scope of the present invention should be construed based on the following claims, and all the technical spirit in the equivalent scope thereto should be construed as falling within the scope of the present invention.

The invention claimed is:

1. A swirl chamber-type diesel engine comprising:
a secondary combustion chamber assembly coupled to a cylinder head to define a secondary combustion chamber having, on an inner wall surface thereof, a curved swirl induction part, and a connecting passage formed at a lower end of the curved swirl induction part; and
a piston defining a primary combustion chamber and including a trench part being in communication with the connecting passage, and clover parts formed at both sides of the trench part,
wherein a bottom surface of the clover parts has a stereoscopic structure in which a height of a bottom surface in a second region, which is distant in a direction of a flow of combustion gas at a predetermined distance from a first region into which the combustion gas is introduced from the trench part, is greater than a height of a bottom surface in the first region,
wherein the clover parts have cylindrical structures disposed adjacent to both sides of the trench part, and each comprise a spiral structure in which the height of the bottom surface is gradually increased in the direction of the flow of the combustion gas and gradually increased in the direction from center to an outer periphery of the clover part, wherein the bottom surface of the clover part has a stereoscopic structure in which the height of the bottom surface is gradually increased in the direction of the flow of the combustion gas so that the introduced combustion gas flows to be gradually raised and circulated simultaneously along a circumference direction of the clover part.

2. The swirl chamber-type diesel engine of claim 1, wherein the clover parts have a structure in which the height of the bottom surface is gradually increased toward an outer periphery thereof.

3. The swirl chamber-type diesel engine of claim 1, wherein the bottom surface of the trench part has a predetermined gradient so that the combustion gas to be introduced into the clover parts is introduced while being raised.

* * * * *